Oct. 6, 1953  K. T. PARSELL  2,654,503
SPECTACLE CASE
Filed Dec. 18, 1951
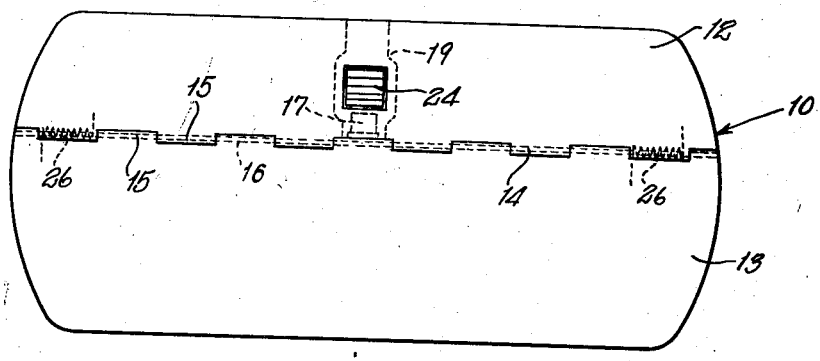
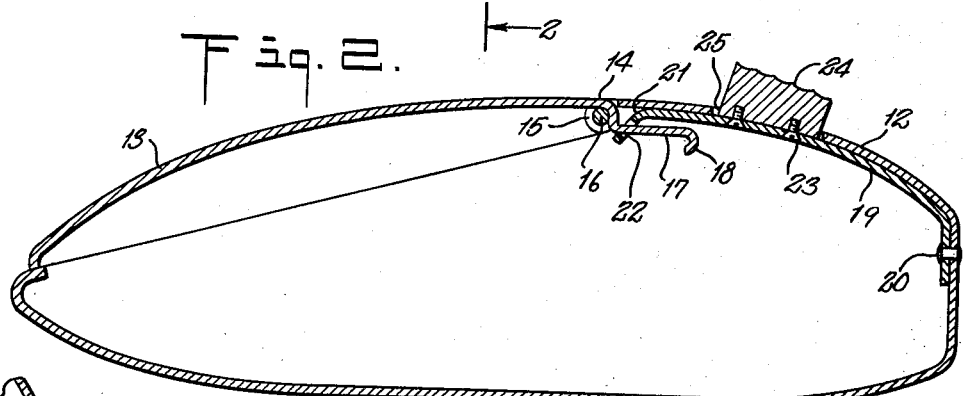
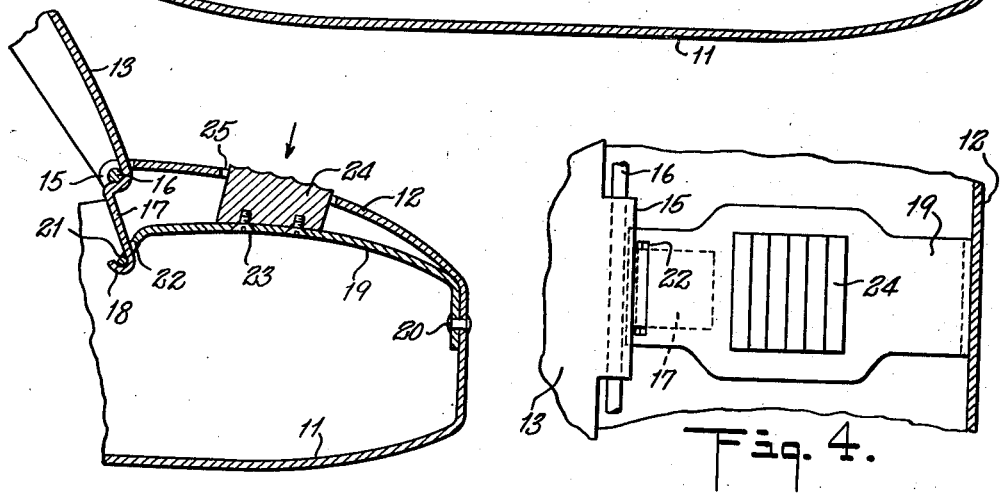
INVENTOR.
KENDRICK T. PARSELL
BY
Kenyon & Kenyon
HIS ATTORNEYS Patented Oct. 6, 1953

2,654,503

UNITED STATES PATENT OFFICE 2,654,503

SPECTACLE CASE

Kendrick T. Parsell, Manhasset, N. Y.

Application December 18, 1951, Serial No. 262,263

3 Claims. (Cl. 220—35)

1

This invention relates to spectacle cases and more particularly spectacle cases of the rigid or semi-rigid type provided with a hinged lid and spring means for normally maintaining the lid in closed position.

Spectacle cases of the kind above referred to are satisfactory for protecting spectacles contained therein but are inconvenient to use. Thus, if the lid is normally kept closed by simple spring means it generally requires the use of two hands to open the lid and since the spectacles must also be grasped in either inserting or removing them, the operation is inconvenient at best. Moreover, if at the time one is handling other things such as a book or steering wheel of an automobile the matter of opening such spectacle cases presents considerable difficulty unless both hands are freed so as to give the matter of opening the spectacle case and the insertion or removal of spectacles one's undivided attention. Certain proposals have been made for making the opening of such spectacle cases more convenient but for different reasons such proposals have either been only partially effective or impractical or both. For example, some spectacle cases are equipped with a toggle arrangement or the like such that when the lid of the case is being opened a dead center is passed and the lid when fully opened will remain in open position until it is positively urged in the opposite direction. However, while such an arrangement is of some advantage in facilitating insertion or removal of spectacles while the lid is open the initial opening of the lid is not facilitated and the closing of the spectacle case requires further manual manipulation which in large measure counteracts the advantage sought to be gained.

It is an object of this invention to provide a spectacle case of the kind referred to which is such that the lid can be opened and closed again while the case is conveniently held in one hand and without changing its position in the hand. It is a further object of this invention to provide such a spectacle case which is of extremely simple construction and which can be produced at low cost. It is a further object of this invention to provide such a spectacle case wherein the operational parts are compact and do not interfere with spectacles to be protected. Another object of this invention is to provide such a spectacle case which in high degree is effective in preventing entry of dust or lint when the spectacle case is carried in one's pocket. It is a still further object of this invention to provide positive means for limiting the movement of the lid when it is being opened.

2

This invention is adapted for embodiment in a spectacle case comprising a casing having a base portion adapted to receive spectacles therein and a cover portion which is fixedly secured to the base portion and which is adapted to partially overlie spectacles received on the base portion, a lid member also being provided which is secured to the cover portion by longitudinally disposed hinge means and which is adapted to overlie and cover the balance of the base portion of the case and spectacles received therein. Features of this invention relate to the provision of a tongue member extending rearwardly from the lid member and from the hinge means in fixed relation to the lid and a lever arm member carried by the casing for coaction adjacent one end thereof with the tongue member for opening the lid against the force of spring means which normally maintain the lid closed, the lever arm member being actuatable for opening the lid by a thumb piece or button member that normally protrudes from the case at a point at which it can be conveniently depressed when holding the case in one hand. A further feature of this invention resides in the provision of means providing coaction of the lever arm member with the tongue member whereby means is afforded for both opening the lid and closing it again and with the provision of such lever arm in the form of a spring strip that provides the aforesaid spring means. A further feature of this invention relates to the provision of means whereby the coaction between the lever arm member and the tongue member is such as to provide stop means for limiting the extent of the opening of the lid. A further feature of this invention relates to the relation of the thumb piece or button member with respect to the lever arm whereby even though the thumb piece or button member extends through an aperture in the case accidental entry of dust or lint into the interior of the casing is effectively prevented.

Further objects, features and advantages of this invention will be apparent from the following description of a typical embodiment of this invention which is shown for illustrative purposes in the accompanying drawings, wherein Fig. 1 is a plan view of a spectacle case according to this invention;

Fig. 2 is a cross section of the spectacle case taken on the line 2—2 of Fig. 1 and on a larger scale which shows the lid of the spectacle case in its normally closed position;

Fig. 3 is a cross section similar to Fig. 2 of a portion of the spectacle case showing the position assumed by the operating parts when the lid is in open position; and Fig. 4 is a plan detail view on the same scale as Figs. 1 and 2 showing the coaction between the tongue and lever arm portions of the operating parts as they appear when the overlying cover portion of the casing is removed.

According to the embodiment shown in the drawings the spectacle case is indicated generally by the reference character 10 and comprises the base portion 11 and the cover portion 12. The base portion 11 is of such size and shape as to be adapted to receive conventional spectacles therein. The cover portion 12 is fixedly secured to the base portion 11 as by being made an integral part thereof as shown. It extends longitudinally of the spectacle case and partially overlies the base portion 11 with sufficient clearance for permitting insertion of spectacles thereunder that are received in the base portion. The lid 13 is hingedly secured to the cover portion 12 of the casing by the longitudinally disposed hinge means 14 and is adapted to be moved between the closed and open positions shown in Figs. 2 and 3 respectively. The hinge means may conveniently be provided by short tongues 15 which extend alternately from the cover portion 12 of the casing and from the lid and which are bent around the hinge pin 16.

Extending rearwardly from the lid and from the hinge means in fixed relation with the lid and preferably integrally therewith is the tongue member 17 having the offset curved end 18. The function of this tongue member as well as the offset curved end thereof will be apparent from the following description.

Extending rearwardly from the tongue member 17 and in alignment therewith is the strip 19 of spring metal such as spring steel. This spring strip underlies the cover portion 12 and is secured to the casing adjacent the end thereof remote from the tongue member 17 by any suitable means such as the rivets 20. As thus secured to the case the strip 19 is normally urged upwardly so that it is normally maintained in the position shown in Fig. 2 by the resilient spring action of the strip itself.

Adjacent the end of the strip 19 that is in proximity to the tongue member 17 the strip 19 has the downwardly curved portion 21 having an aperture 22 therein through which the tongue member 17 extends and the interior surfaces of which are in proximate abutting relation with respect to the surfaces of the tongue member 17.

Secured to the upper surface of the strip 19 by any suitable means such as the screws 23 is the button member 24 which passes through the aperture 25 in the cover portion 12 of the casing with sufficient clearance to permit unobstructed depression of the button member 24 which provides a thumb piece. The button member 24 is referred to as a thumb piece due to the fact that when the spectacle case is grasped in one hand the thumb naturally falls at the position of the button member and the button member can be conveniently depressed by the thumb. However, the button member can, of course, be depressed by use of a finger if desired. Since the strip 19 is normally maintained in the position shown in Fig. 2, the button member normally protrudes substantially from the cover portion 12 of the casing and is depressible by the thumb or finger.

When the button member 24 is depressed against the resilient force normally exerted by the strip 19, the strip 19 acts as a lever arm presenting a part adjacent one end thereof that is effective to depress the tongue member 17 and thereby causes the lid to open until the parts assume the position shown in Fig. 3. When the parts have been moved to this position it is to be noted that the curved portion 18 at the end of the tongue member 17 engages the end of the strip 19 on the far side of the aperture 22 thereby providing stop means which limits the extent to which the lid 13 may be opened and which likewise effectively prevents excessive depression of the strip 19 which otherwise might come in contact with spectacles within the casing. In this connection it is to be noted that the tongue member 17 and the strip 19 are centrally located and as so located are in the region between the lenses of spectacles within the casing where there is ample room for their being moved from the position shown in Fig. 2 to the position shown in Fig. 3. Moreover, it is to be noted that the mechanical cooperation of the parts permits such compactness that the lid can be opened wide for convenience in use without their extending to an excessive extent into the interior of the spectacle case, thereby avoiding any interference with spectacles within the case. Moreover, the stop means above described is preferably employed and is adapted to prevent any undue depression of the parts in use.

After the lid has been opened as by pressing the thumb against the button member 24 so as to cause the parts to assume the position shown in Fig. 3, all that is required to close the lid again is to relieve the pressure on the button member 24 thus permitting the resilient force of the spring strip 19 to exert pressure on the under side of the tongue member 17 for positively closing the lid and holding the lid in normally closed position.

The convenience in use of the spectacle case of this invention is believed to be apparent from the foregoing description. Thus, when the spectacle case is picked up, and it makes no difference whether with the right or left hand, and when it is held in one hand the thumb normally falls where the button member is located. Then while the spectacle case is still held in one hand the lid can be opened wide merely by exerting moderate pressure with the thumb. The other hand can thus be left free to insert or remove the spectacles and when this has been done the lid will snap shut again automatically merely by release of the thumb pressure on the button while still holding the case in only one hand.

Another feature of practical utility of the spectacle case of this invention is that the means for opening and closing the lid does not detract from the effectiveness of the case in preventing access of dust or lint. Thus, according to the preferred construction shown in the drawings the spring strip 19 is of substantially greater lateral extent than the button member 24 and the aperture 25 through which it protrudes and likewise is formed so as to conform to the under surface of the cover portion 12 of the casing. By such construction and relative configuration the resilient force inherent in the spring strip 19 normally maintains the upper surface thereof in snug pressure contact with the under surface of the cover portion 12 that surrounds the aperture 25 thereby effectively preventing any access of dust or lint into the casing.

In spectacle cases having a lid of the kind illustrated according to the embodiment shown in the drawings it has been common practice to utilize small coil springs which normally exert force for maintaining the lid closed and such springs have been indicated by the reference characters 26 in Fig. 1. Such springs may if desired be retained according to this invention for the purpose of supplementing the action of the spring strip 19 in normally maintaining the lid in closed position. However, it is normally preferable to omit the springs 26 so as to reduce cost and to rely for spring means only on the spring strip 19, thereby replacing the coil springs with the inexpensive spring strip while at the same time realizing the features of utility and advantage according to this invention. However, if spring means such as the springs 26 are retained these springs can constitute the principal or sole spring means for maintaining the lid in closed position and in such case it would not be necessary for the strip 19 to possess resilient spring properties, the strip 19 merely functioning as a lever arm that is actuatable responsive to pressure applied to the button member 24 for opening and closing the lid. Moreover, in such case it would not be necessary for the end of the strip 19 to contain the aperture 22 and the end of the strip 19 could merely be adapted to contact the upper surface of the tongue member 17.

While a specific preferred embodiment of this invention has been shown and described it is to be understood that this has been done merely for illustrative purposes and that the particular form shown can be varied in accordance with the principles herein disclosed. For example, the strip 19 may assume different configurations for functioning as a lever arm and preferably also as spring means. Moreover, it is not essential to employ a separate button member, for the strip 19 can if desired be deformed so that a portion thereof will protrude through aperture means in the cover portion of the casing so as to function as a thumb piece, thereby saving the cost of a separately manufactured button member that has to be secured to the strip.

In addition to the utility and improved convenience afforded by the spectacle case of this invention further advantages result from its extremely low cost. Thus, the cost of the casing and the lid is virtually the same as the corresponding parts of a conventional spectacle case for the parts are essentially the same except that one of the hinge forming tongues along the margin of the lid is merely made a little longer and is extended rearwardly instead of being bent about the hinge pin. Moreover, the spring strip 19 is a very inexpensive part to produce and even the low cost of this strip can be compensated for by elimination of other spring means such as the springs 26 which are normally employed in conventional spectacle cases. In addition the assembly of the parts merely involves the securement of one end of the spring strip 19 to the casing and the cost of this operation is offset as compared with a conventional spectacle case by eliminating the operation of putting the spring means 26 in position. It is thus seen that a spectacle case which is greatly improved from the standpoint of convenience and increased facility of manual operation has been afforded according to this invention by extremely economical means.

I claim:

1. A spectacle case comprising a casing having a base portion adapted to receive spectacles thereon and a cover portion fixedly secured to said base portion in longitudinal relation thereto which partially overlies said base portion in spaced relation thereto for inserting thereunder a portion of spectacles received on said base portion, a lid which is hingedly secured by longitudinally disposed hinge means to said cover portion of said casing and which is adapted to overlie the balance of said base portion and complete the coverage of spectacles received on said base portion, a tongue member extending rearwardly from said lid and from said hinge means in fixed relation to said lid, a resilient spring strip extending rearwardly from said tongue member having aperture means adjacent one end thereof penetrated by said tongue member in slidable relation thereto and secured adjacent the other end thereof to said casing so as to normally urge said apertured end thereof and said tongue member resiliently upwardly for normally maintaining said lid in closed position, and a thumb piece fixedly carried by said spring strip in normally protruding relation to said cover portion of said casing and adapted to be manually depressed to depress said apertured end of said lever arm against said tongue member to open said lid.

2. A spectacle case comprising a casing having a base portion adapted to receive spectacles thereon and a cover portion integral with said base portion in longitudinal relation thereto which partially overlies said base portion in spaced relation thereto for inserting thereunder a portion of spectacles received on said base portion, a lid which is hingedly secured by longitudinally disposed hinge means to said cover portion of said casing and which is adapted to overlie the balance of said base portion and complete the coverage of spectacles received on said base portion, a tongue member integral with said lid extending rearwardly from said lid and from said hinge means at approximately the mid point of the overall length of said case, a resilient spring strip extending rearwardly from said tongue member having aperture means adjacent one end thereof penetrated by said tongue member and secured adjacent the other end thereof to said casing so as to normally urge said aperture end thereof and said tongue member resiliently upwardly for normally maintaining said lid in closed position, and a button member secured to said spring strip and extending through an aperture in said cover portion of the casing so as to normally protrude substantially therefrom for permitting depression thereof so as to depress said spring strip and said tongue member to open said lid, said tongue member being provided with an offset portion adapted to coact with end of said spring strip adjacent said aperture therein for limiting the extent of the depression of said spring strip and the extent of the opening of said lid.

3. A spectacle case according to claim 2 wherein a portion of the surface of said spring strip adjacent said button member normally abuts the under surface of said cover portion of said casing surrounding said aperture in said cover portion of said casing thereby preventing access of dust into the interior of said casing about said button member.

KENDRICK T. PARSELL.

References Cited in the file of this patent

FOREIGN PATENTS

| Number | Country | Date |
|--------|---------|------|
| 8,167 | Great Britain | 1884 |